Oct. 11, 1960 J. S. FERM 2,955,624
WIRE LEAD FORMING TOOL
Filed Jan. 20, 1958 2 Sheets-Sheet 1
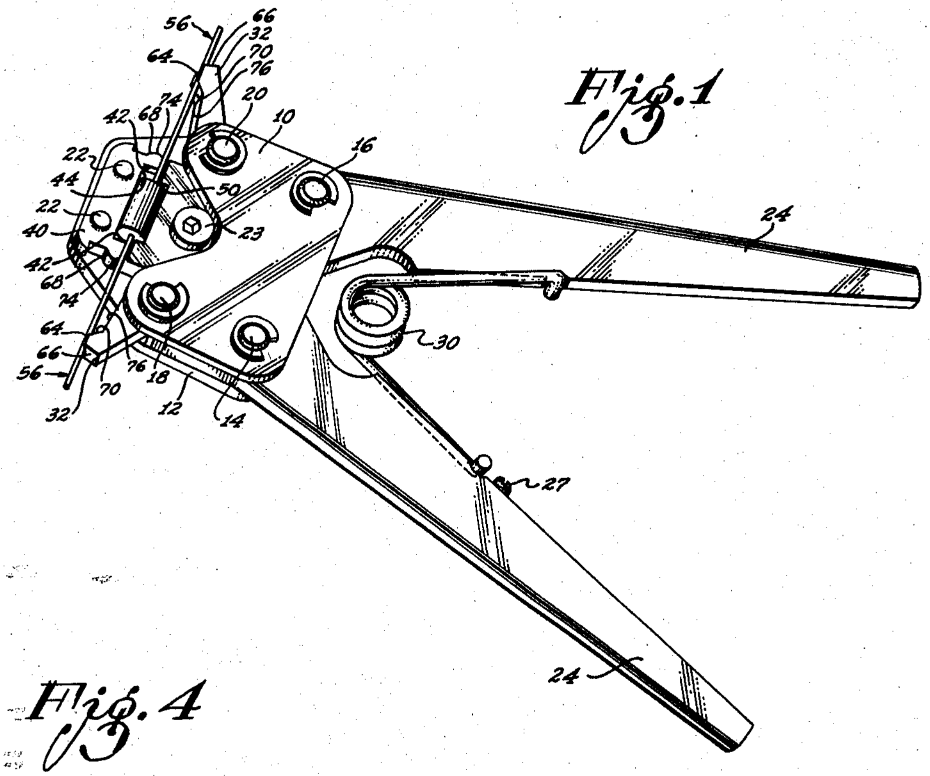
Fig. 1
Fig. 4
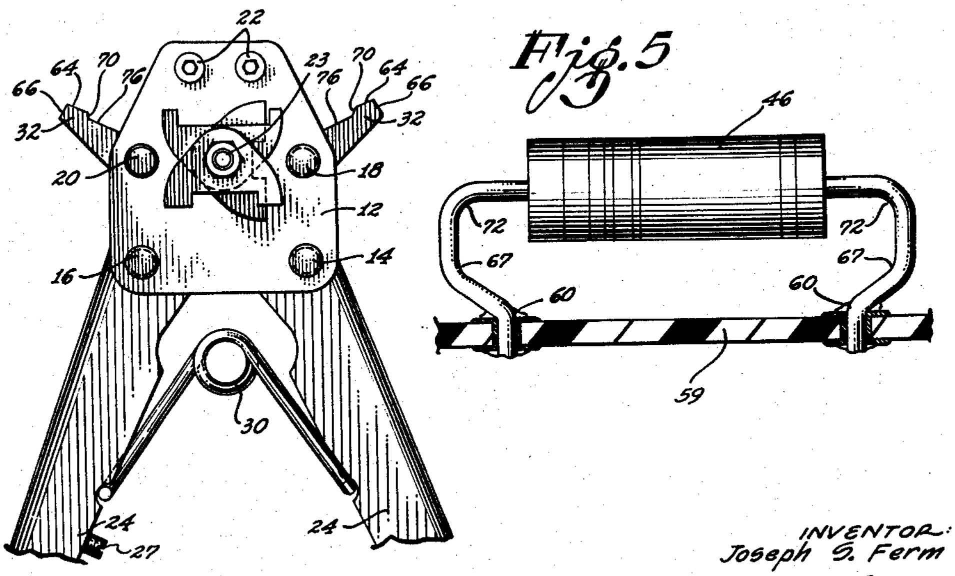
Fig. 4, Fig. 5
INVENTOR:
Joseph S. Ferm
By Willard M. Graham
AGENT Oct. 11, 1960 J. S. FERM 2,955,624

WIRE LEAD FORMING TOOL

Filed Jan. 20, 1958 2 Sheets-Sheet 2

INVENTOR:
Joseph S. Ferm

By Willard M. Graham
AGENT

United States Patent Office 2,955,624
Patented Oct. 11, 1960

2,955,624

WIRE LEAD FORMING TOOL

Joseph S. Ferm, Huntington Beach, Calif., assignor to Northrop Corporation, Beverly Hills, Calif., a corporation of California Filed Jan. 20, 1958, Ser. No. 709,971

2 Claims. (Cl. 140—123)

This invention has to do with a tool and more particularly a tool that has for its purposes the forming of wire, or metal leads of an electrical component.

Printed circuits, as now visualized, demand rugged and precise construction in order to prevent complete failure of operation of the particular circuit involved. Components such as resistors, capacitors and the like, that must have their leads accurately formed have them inserted through precisely located openings in a board that may or may not have conductor strips on both sides. There are several requirements that must be fulfilled in preparing the component leads: They should not be formed more than once to prevent fatigue; compression, stretch and shear forces on the leads, except where desired, must not occur in order to prevent component damage.

The tool that is to provide the preceding results should be constructed in such a manner that repeatable precision results will be obtained with skilled, semi-skilled and unskilled labor, and component output should be considerably increased over the laborious hand forming method.

An object of this invention is to provide a tool that will precisely and accurately form the leads of an electrical component without imposing compression, stretch or shear forces.

Another object of this invention is to provide a tool that may be readily and economically fabricated; that may be used by unskilled labor; that will withstand a considerable amount of abuse without impairing its operation or accuracy.

Briefly the invention comprises structure for properly holding an electrical component, such as a resistor, which has opposed electrical leads. A pair of jaws actuated by a pair of handles engages the leads and forces them to bend about a die resulting in the proper precise form being established. At the same time that part of the leads that may be considered excess material is sheared.

Figure 1 is a front perspective view of the tool illustrating and having embodied therein the present invention.

Figure 4 is a fragmentary, rear view of the tool illustrating certain desirable structure.

Figure 5 is a view of a mounted electrical component that has had the leads formed by the tool.

Figure 2:
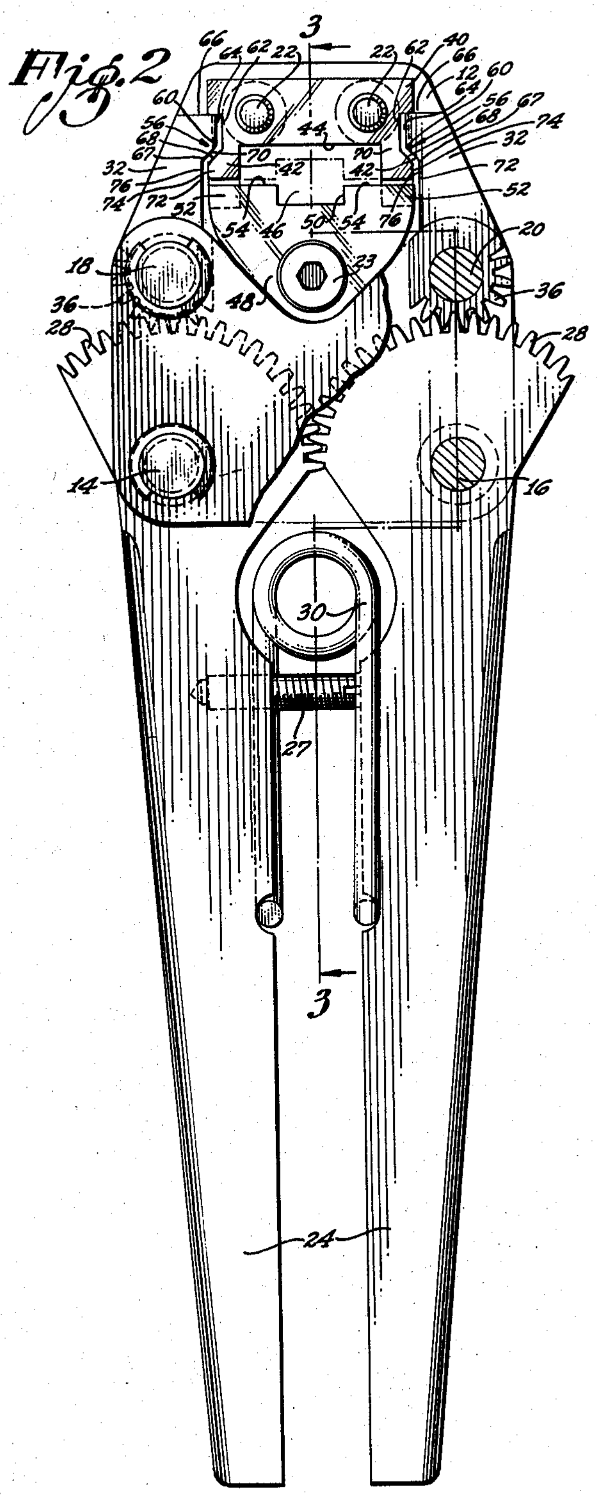
Figure 2 is an enlarged view of the tool illustrating in detail the method of actuating the lead forming structure.

Referring to the drawings for a more detailed description of the present invention 10 and 12 identifies front and back mounting or retaining plates respectively. Plate 10 has four openings therethrough to receive fixed shafts 14, 16, 18, and 20. Plate 12 has seven openings therethrough four of which receive shafts 14, 16, 18, and 20, and three receive bolts or fasteners 22 and 23.

Handles 24 are on and rotatable about shafts 14 and

Figure 3:
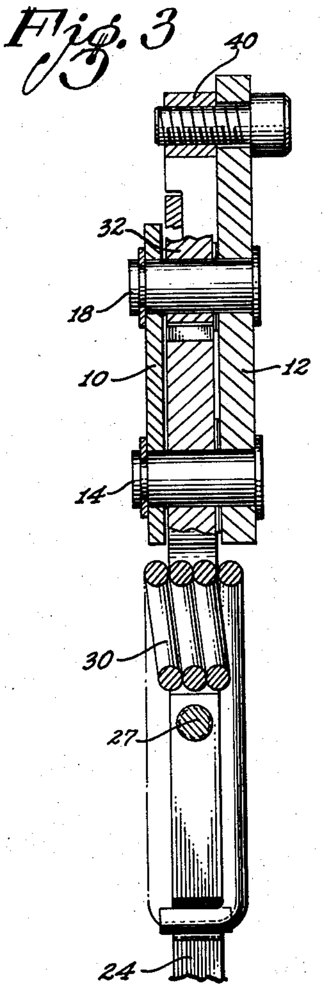
Figure 3 is a fragmentary, cross-sectional view taken on line 3—3 of Figure 2.

16 respectively and are located between the plates 10 and 12, Figure 3. Each handle has a partial spur gear 28 integral therewith that meshes with the opposed gear.

Threadably attached to one of the handles 24 is a stop screw 27 that extends toward the opposed handle, and has for its purpose the limiting of movement of the handles in one direction.

A torsion spring 30, located between and attached to each handle 24, urges the handles to the position illustrated in Figures 1 and 4.

Identical jaws 32 are on and rotate about shafts 18 and 20 and are also located between plates 10 and 12. Each jaw has a spur gear 36 integral therewith that meshes with the corresponding spur gear on the respective handle. As a result of this arrangement of parts, movement of handles 24 causes the jaws 32 to assume the extended position shown in Figures 1 and 4 or the closed position illustrated in Figure 2.

The two bolts 22 retain die 40 on plate 12. Attention is directed to Figure 2 where a detail of die 40 may be seen. The die 40 is generally U-shaped, providing a pair of spaced apart, and identical legs 42 that in turn define a notch 44. The interior distance between the legs 42 is greater than the length of the body 46 of an electrical or electronic component.

Bolt 23 retains triangular shaped guide 48 on plate 12, Figure 2. Also additional guides of different sizes are retained by bolt 23 on the back of plate 12, Figure 4. The guide has a notch 50 therein that is defined by legs 52. The internal distance between legs 52 is substantially equal to the length of the body 46 of the electrical or electronic component. As a result of the arrangement of die 40 with respect to guide 48 the body 46 may be inserted into the corresponding and cooperating notches and side to side movement is prevented.

Attention is directed to the fact that the legs 52, of the guide, which are opposed to the legs 42, of the die, are spaced therefrom to provide channels 54 which receive the leads 56 of the electrical or electronic component, Figures 1 and 2. The space between legs 42 and 52 is just sufficient to provide room for inserting the leads 56 into the channels 54.

Attention is directed to Figures 1, 2, 4, and 5. The body 46 of the component as well as the leads 56 can only be inserted in their proper location when the jaws 32 are in the position illustrated in Figures 1 and 4.

Formation of the leads 56 is critical and very important. The distance between the free ends of the leads 56 is controlled by the outside configuration of the die 40, Figure 2. The electronic component is mounted and soldered in a printed circuit card or board 59 as illustrated in Figure 5. The board, as stated, has openings therethrough to receive the free ends of the leads 56. It may be stated that the distance between the free ends of the leads 56 is slightly greater than the distance between the centers of the openings in the board 59. The reason being that the leads must be squeezed a slight amount in order for them to be inserted, and the tendency to spring back to the formed shape provides greater retention when in place prior to soldering.

The distance from the free ends of each lead 56 to the first bend 60 is controlled and the notch 62 formed in each leg 42 is the controlling factor. The notch 62 not only receives a portion of the lead 56, but also receives the forming face 64 of each jaw 32. The forming face 64 in cooperation with the upper surface 66 of each jaw provides a knife edge that cooperates with the die 40 to sever the excess lead material.

The bend 60 of the leads 56 is the reference or indexing point for the electronic component. In other words, the bend 60 determines the distance of the body 46 of the component from the board 59. Therefore it may be stated that the distance the free ends of the leads 56 extend through the board 59 is also controlled.

The distance from the first bends 60 to the next bends 67 is controlled by the inclined surfaces 68 on the legs of the die that function in cooperation with the inclined surfaces 70 on the jaws 32.

Also the distance between bends 67 of the leads to bends 72 is controlled by surfaces 74 of the legs of the die acting in cooperation with surfaces 76 of the jaws. Finally, the distance between bends 72 and the component body 46 is controlled by the distance surfaces 74 are from the body 46.

Attention is directed to this additional fact. The jaws 32 do not impose any shear, except where desired, stretch or compression force on the leads 56. This result is accomplished by the fact that the leads 56 merely rest on the jaws 32 as illustrated and that when the jaws form the leads the forces are absorbed by the legs 42 of the die 40 and not by the body 46. For instance, the jaws 32 first cause a forming of the leads 56 about surface 74. The movement of the jaws, subsequently, is all upward and inward but surface 74 absorbs all the forces.

Briefly the operation of the device is as follows: The tool is held in the hand with the jaws 32 extended as illustrated in Figure 1. The component body 46 is inserted in the die and guide 40 and 48 with the leads 46 being received in channels 54 and resting on jaws 32. The handles 24 are squeezed together resulting in the jaws 32 moving toward the position illustrated in Figure 2. As a result, the leads 56 are formed about the die 40 to provide the configuration illustrated in Figure 5.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed:

1. A tool comprising a pair of pivotal members; a spaced pair of pivotal elements interconnected to and actuated by said members; means between said elements about which wire leads of an electrical component are formed; and structure between said elements into which an electrical component may be inserted.

2. A tool comprising a pair of pivotal handles having intermeshing gears thereon; a pair of pivotal jaws each of which has a gear thereon that meshes with the gear of the corresponding handle; a die between said jaws about which wire leads of an electrical component are formed by said jaws; and a guide holder between said jaws into which an electrical component may be inserted.

References Cited in the file of this patent

UNITED STATES PATENTS

| | | |
|---|---|---|
| 823,367 | Ryan | June 12, 1906 |
| 1,105,191 | Flora et al. | July 28, 1914 |
| 1,670,201 | McGary | May 15, 1928 |
| 1,722,279 | Davis | July 30, 1929 |
| 2,324,415 | Moss | July 13, 1943 |